United States Patent
Lu et al.

(10) Patent No.: US 12,063,541 B2
(45) Date of Patent: Aug. 13, 2024

(54) METHOD FOR DETERMINING DRX PARAMETER, TERMINAL DEVICE AND STORAGE MEDIUM

(71) Applicant: GUANGDONG OPPO MOBILE TELECOMMUNICATIONS CORP., LTD., Dongguan (CN)

(72) Inventors: Qianxi Lu, Dongguan (CN); Bingxue Leng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/373,661

(22) Filed: Sep. 27, 2023

(65) Prior Publication Data
US 2024/0031857 A1   Jan. 25, 2024

Related U.S. Application Data

(63) Continuation of application No. PCT/CN2021/092216, filed on May 7, 2021.

(51) Int. Cl.
*H04W 28/02* (2009.01)
*H04W 52/02* (2009.01)
*H04W 76/28* (2018.01)

(52) U.S. Cl.
CPC ... *H04W 28/0221* (2013.01); *H04W 52/0229* (2013.01); *H04W 76/28* (2018.02)

(58) Field of Classification Search
None
See application file for complete search history.

(56) References Cited

U.S. PATENT DOCUMENTS

2009/0040955 A1*   2/2009   Jung .................. H04W 52/0216
                                                    370/342
2021/0297842 A1*   9/2021   Shrivastava .......... H04W 28/24
(Continued)

FOREIGN PATENT DOCUMENTS

CN          103402245 A        11/2013
CN          109479189 A         3/2019
(Continued)

OTHER PUBLICATIONS

International Search Report in the international application No. PCT/CN2021/092216, mailed on Jan. 29, 2022. 5 pages with English translation.

(Continued)

*Primary Examiner* — Hassan A Phillips
*Assistant Examiner* — Gautam Sharma
(74) *Attorney, Agent, or Firm* — BAYES PLLC

(57) ABSTRACT

A method for determining a DRX parameter, a terminal device, and a non-transitory computer-readable storage medium are provided. The method includes: determining, by a terminal device, a DRX parameter corresponding to a first physical transmission, the DRX parameter corresponding to the first physical transmission being a first DRX parameter corresponding to a Quality of Service (QoS) parameter associated with the first physical transmission or a default second DRX parameter; and performing, by the terminal device, the first physical transmission based on the DRX parameter corresponding to the first physical transmission.

15 Claims, 5 Drawing Sheets

(56) References Cited

U.S. PATENT DOCUMENTS

| | | | |
|---|---|---|---|
| 2022/0052753 A1* | 2/2022 | Speidel | H04W 16/10 |
| 2022/0369417 A1 | 11/2022 | Park | |
| 2023/0337319 A1* | 10/2023 | Luo | H04W 76/28 |

FOREIGN PATENT DOCUMENTS

| | | |
|---|---|---|
| CN | 111642033 A | 9/2020 |
| CN | 112543442 A | 3/2021 |
| WO | 2018016882 A1 | 1/2018 |
| WO | 2021002723 A1 | 1/2021 |

OTHER PUBLICATIONS

Written Opinion of the International Search Authority in the international application No. PCT/CN2021/092216, mailed on Jan. 29, 2022. 6 pages with English translation.

VIVO: "SL DRX for Unicast", 3GPP Draft; R2-2102816, 3rd Generation Partnership Project (3GPP), Mobilecompetence Centre ; 650, Route Des Lucioles ; F-06921 Sophia-Antipolis Cedex; France vol. RAN WG2, No. electronic; Apr. 12, 2021-Apr. 20, 2021, Apr. 2, 2021 (Apr. 2, 2021), XP052174400, the whole document , 10 pages.

MCC Support: "Draft Report of 3GPP TSG RAN WG1 #104bis-e v0.1.0 (Online meeting, Apr. 12-20, 2021)", 3GPP Draft; Draft_Minutes_Report_RAN1#104BIS-E_v010, 3rd Generation Partnership Project (3GPP) Mobile Competence Centre ; 650, Route Des Lucioles ; F-06921 Sophia-Antipolis Cedex; France vol. RAN WGI, No. e-Meeting; May 10, 2021-May 27, 2021, Apr. 30, 2021 (Apr. 30, 2021), XP051998479, 8.11 NR Sidelink enhancement; p. 108-p. 111, 142 pages.

Supplementary European Search Report in the European application No. 21939699.1, mailed on Mar. 27, 2024, 10 pages.

* cited by examiner

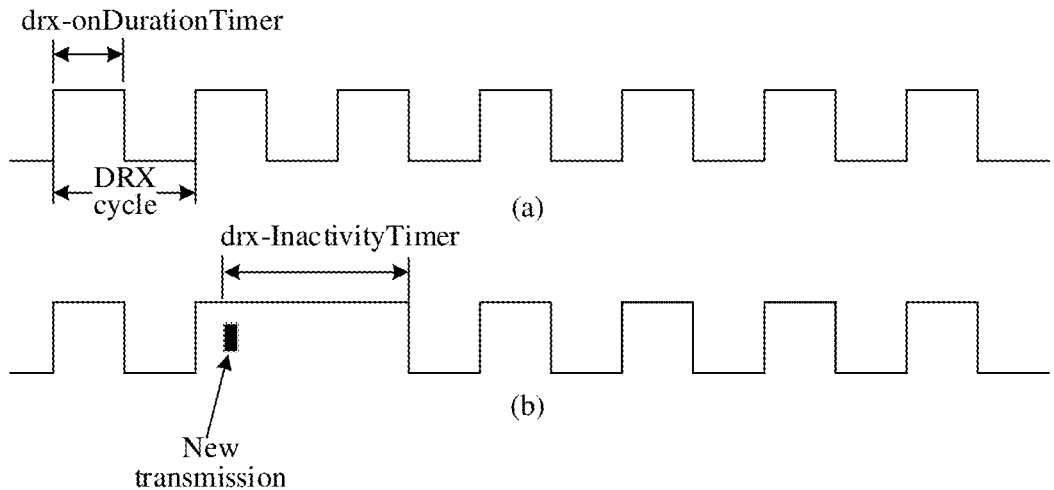

FIG. 4

```
┌─────────────────────────────────────────────────────┐
│ A terminal device determines a DRX parameter corresponding to │
│ a first physical transmission. The DRX parameter corresponding │ 501
│    to the first physical transmission is a first DRX parameter │
│    corresponding to a QoS parameter associated with the first │
│    physical transmission or a default second DRX parameter │
└─────────────────────────────────────────────────────┘
                            │
                            ▼
┌─────────────────────────────────────────────────────┐
│   The terminal device performs the first physical transmission │ 502
│   based on the DRX parameter corresponding to the first physical │
│                         transmission │
└─────────────────────────────────────────────────────┘
```

FIG. 5

METHOD FOR DETERMINING DRX PARAMETER, TERMINAL DEVICE AND STORAGE MEDIUM

CROSS-REFERENCE TO RELATED APPLICATION

This application is a continuation of International Patent Application No. PCT/CN2021/092216, filed on May 7, 2021, the disclosure of which is hereby incorporated by reference in its entirety.

BACKGROUND

In the project of sidelink enhancement, it is discussed that the DRX mechanism is introduced in the sidelink transmission to achieve the purpose of saving power of a terminal device through the DRX mechanism.

At present, for the DRX mechanism in sidelink transmission, it is impossible to determine the DRX parameter corresponding to physical transmission in some situations, thus the DRX mechanism in the sidelink transmission needs to be improved.

SUMMARY

Embodiments of the present disclosure relate to the technology field of mobile communication, and provide a method for determining a Discontinuous Reception (DRX) parameter, a terminal device and a non-transitory computer-readable storage medium.

The method for determining a DRX parameter provided by the embodiments of the present disclosure includes the following operations.

A terminal device determines a DRX parameter corresponding to a first physical transmission. The DRX parameter corresponding to the first physical transmission is a first DRX parameter corresponding to a Quality of Service (QoS) parameter associated with the first physical transmission or a default second DRX parameter.

The terminal device performs the first physical transmission based on the DRX parameter corresponding to the first physical transmission.

A terminal device provided by the embodiments of the present disclosure includes a processor, a transceiver and a memory. The memory is configured to store a computer program, and the processor is configured to invoke and run the computer program stored in the memory to: determine a DRX parameter corresponding to a first physical transmission, the DRX parameter corresponding to the first physical transmission being a first DRX parameter corresponding to a QoS parameter associated with the first physical transmission or a default second DRX parameter; and control the transceiver to perform the first physical transmission based on the DRX parameter corresponding to the first physical transmission.

A non-transitory computer-readable storage medium provided by the embodiments of the present disclosure is configured to store a computer program. The computer program causes a computer to perform the following operations: determining a DRX parameter corresponding to a first physical transmission, the DRX parameter corresponding to the first physical transmission being a first DRX parameter corresponding to a QoS parameter associated with the first physical transmission or a default second DRX parameter; and performing the first physical transmission based on the DRX parameter corresponding to the first physical transmission.

BRIEF DESCRIPTION OF THE DRAWINGS

The drawings illustrated the present disclosure serve to provide a further understanding of the present disclosure and constitute a part of the present disclosure, and the illustrative embodiments of the present disclosure and the description thereof are used to explain the present disclosure and are not intended to limit the present disclosure.

FIG. 4 is a schematic diagram of an active time corresponding to the drx-Inactivity Timer provided by an embodiment of the present disclosure.

FIG. 5 is a flowchart of a method for determining a DRX parameter provided by an embodiment of the present disclosure.

DETAILED DESCRIPTION

The technical solutions of the embodiments of the present disclosure will be described below in combination with the drawings in the embodiments of the present disclosure. It is apparent that the described embodiments are part of but not all of the embodiments of the present disclosure. Based on the embodiments in the present disclosure, all other embodiments obtained by those of ordinary skill in the art without paying creative efforts fall within the scope of protection of the present disclosure.

The technical solutions of the embodiments of the present disclosure may be applied to various communication systems, for example, a Long Term Evolution (LTE) system, an LTE Frequency Division Duplex (FDD) system, an LTE Time Division Duplex (TDD) system, a 5th-generation (5G) communication system or a future communication system, etc.

Figure 1:
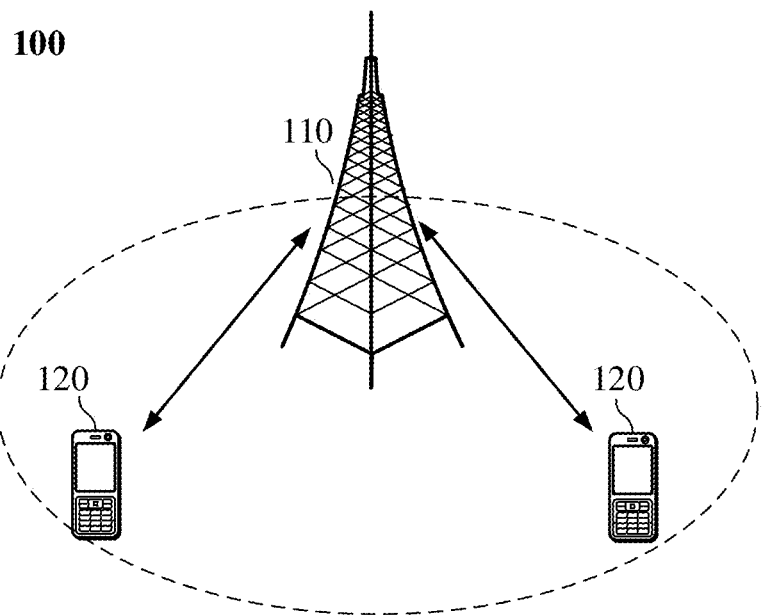
FIG. 1 is a schematic diagram of a communication system architecture provided by an embodiment of the present disclosure.

Exemplarily, the communication system 100 to which embodiments of the present application are applied is illustrated in FIG. 1. The communication system 100 may include a network device 110 which may be a device that communicates with a terminal 120 (or called as a communication terminal, a terminal). The network device 110 may provide communication coverage for a particular geographic area and may communicate with terminals located within the coverage area. Alternatively, the network device 110 may be an Evolutional Node B (eNB or eNodeB) in an LTE system, or a wireless controller in a Cloud Radio Access Network (CRAN), or the network device may be a mobile switching center, a relay station, an access point, a vehicle-mounted device, a wearable device, a hub, a switch, a bridge, a router, a network-side device in a 5G network, or a network device in a future communication system, etc.

The communication system 100 further includes at least one terminal 120 located within the coverage area of the network device 110. The term "Terminal" as used herein includes, but is not limited to, an apparatus configured to receive/transmit communication signals connected via a wireline, such as via a Public Switched Telephone Network (PSTN), a Digital Subscriber Line (DSL), a digital cable, a direct cable connection; and/or another data connection/network; and/or a wireless interface, such as for a cellular network, a Wireless Local Area Network (WLAN), a digital television network such as a DVB-H network, a satellite network, an AM-FM broadcast transmitter; and/or another terminal; and/or an Internet of Things (IoT) device. A terminal configured to communicate via a wireless interface may be called a "wireless communication terminal", a "wireless terminal", or a "mobile terminal". Examples of the mobile terminal include but are not limited to a satellite or cellular phone, a Personal Communications System (PCS) terminal that may combine capabilities of a cellular radio telephone and data processing, facsimile, and data communication, a Personal Digital Assistant (PDA) that may include a radio telephone, a pager, an Internet/Intranet access, a Web browser, a notebook, a calendar, and/or a Global Positioning System (GPS) receiver, and a conventional laptop and/or handheld receiver or other electronic devices including a radio telephone transceiver. The terminal may be called an access terminal, User Equipment (UE), a subscriber unit, a subscriber station, a mobile station, a mobile stage, a remote station, a remote terminal, a mobile device, a user terminal, a terminal, a wireless communication device, a user agent, or a user device. The access terminal may be a cellular telephone, a cordless telephone, a Session Initiation Protocol (SIP) telephone, a Wireless Local Loop (WLL) station, a Personal Digital Assistant (PDA), a handheld device with a wireless communication function, a computing device or other processing devices connected to a wireless modem, a vehicle-mounted device, a wearable device, a terminal in 5G network or a terminal in a future evolutional Public Land Mobile Network (PLMN), etc.

Alternatively, a Device to Device (D2D) communication may be performed between the terminals 120.

Alternatively, the 5G communication system or 5G network may also be called a New Radio (NR) system or an NR network.

FIG. 1 exemplarily illustrates one network device and two terminals. Alternatively, the communication system 100 may include a plurality of network devices, and another number of terminals may be included within the coverage area of each network device, which is not limited in embodiments of the present disclosure.

Alternatively, the communication system 100 may further include other network entities such as a network controller, a mobility management entity and the like, which is not limited in embodiments of the present disclosure.

It should be understood that a device having a communication function in a network/system in the embodiments of the present disclosure may be called a communication device. Taking the communication system 100 illustrated in FIG. 1 as an example, the communication device may include a network device 110 and terminals 120 that have communication functions, and the network device 110 and the terminals 120 may be specific devices described above, which will not be elaborated herein again. The communication device may further include other devices in the communication system 100, such as other network entities like a network controller and a mobility management entity, which are not limited in embodiments of the present disclosure.

It should be understood that the terms "system" and "network" may be used interchangeably in the present disclosure. In the present disclosure, the term "and/or" is merely used for describing an association relationship that describes related objects, which indicates that there may be three relationships, for example, A and/or B, which means that there are three cases: A exists alone, A and B exist simultaneously, and B exists alone. In addition, the character "/" in the present disclosure generally indicates that there is "or" relationship between the related objects.

In order to facilitate understanding of the technical solutions of the embodiments of the present disclosure, the technical solutions related to the embodiments of the present disclosure are described below.

Device to Device (D2D)

D2D communication is based on Sidelink (SL) transmission technology, which is different from the technology that communication data is received from or sent by the base station in the traditional cellular system. The internet of vehicle system adopts the D2D communication manner (i.e., the communication manner of a device directly communicating with another device), so it has higher spectrum efficiency and lower transmission delay. For the D2D communication, the Third Generation Partnership Project (3GPP) defines two transmission modes: Mode A and Mode B. Mode A and Mode B are described below.

Figure 2A:
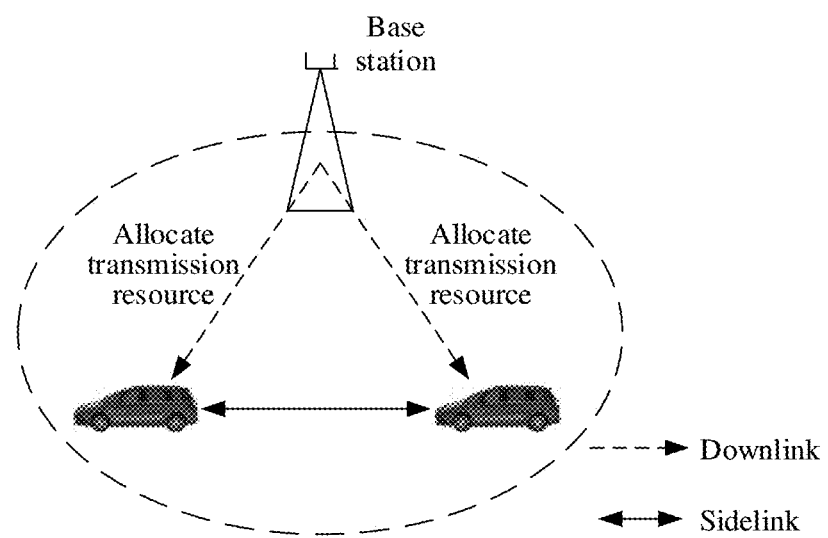
FIG. 2A is a schematic diagram of Mode A provided by an embodiment of the present disclosure.

Mode A: As illustrated in FIG. 2A, transmission resources of the terminal device are allocated by the base station, and the terminal device transmits data on the sidelink according to the resources allocated by the base station. The base station may allocate the resources for a single transmission for the terminal devices, and may also allocate the resources for a semi-static transmission for the terminal devices.

Figure 2B:
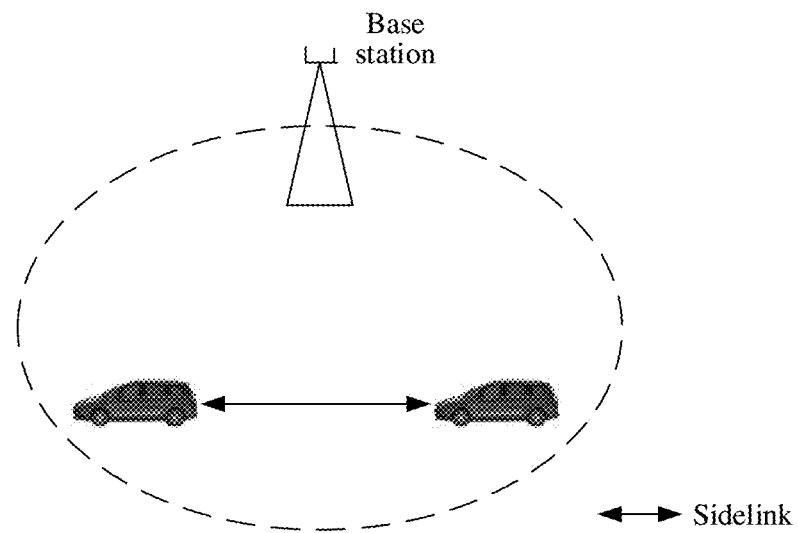
FIG. 2B is a schematic diagram of Mode B provided by an embodiment of the present disclosure.

Mode B: As illustrated in FIG. 2B, the terminal device selects a resource in the resource pool to transmit data. Specifically, the terminal device may select the transmission resource in the resource pool by monitoring or randomly selecting.

In 3GPP, D2D communication is developed through the following different stages.

Proximity based Service (ProSe): The D2D communication is studied for a ProSe scenario, which mainly focuses on public security services. In ProSe, the purpose of the terminal device discontinuously transmitting/receiving on the sidelink is achieved by configuring the position of the resource pool in the time domain, for example, the resource pool is discontinuous in the time domain, which can achieve the effect of saving power.

Vehicle to Everything (V2X): The D2D communication is studied for a communication scenario between vehicles and other devices, which mainly focus on the communication services, such as vehicle to vehicle and vehicle to people, with a relatively high speed in movement. In V2X, the power efficiency is not the main problem because of the continuous power supply of the vehicle system, but the delay of data transmission is the main problem, thus the terminal device is required to transmit and receive continuously in the system design.

Further Enhancement Device to Device (FeD2D): the D2D communication is studied for a scenario of wearable devices accessing the network through a mobile phone, which mainly focus on the scenario of a low mobile speed and low power access. In FeD2D, in the pre-research stage, 3GPP concluded that the base station may configure DRX parameters of a remote terminal device through a relay terminal device.

NR V2X

In NR V2X, automatic driving needs to be supported, so requirements are put forward for data interaction between vehicles, such as higher throughput, lower delay, higher reliability, larger coverage area and more flexible resource allocation.

On the basis of LTE V2X, the scenario in which V2X applications of NR V2X are studied is not limited to the broadcast scenario, but is further extended to unicast and multicast scenario. For the unicast transmission manner, there is only one terminal device at the receiving end. For the multicast transmission manner, the receiving end includes all the terminal devices in a communication group or all the terminal devices within a certain transmission distance. For broadcast transmission manner, the receiving end is any terminal device.

In the NR V2X system, many types of transmission modes are introduced, which include Mode 1 and Mode 2. In the Mode 1, the network device allocates transmission resources for the terminal devices (similar to the above Mode A), and in the Mode 2, the terminal devices select transmission resources (similar to the above Mode B). Further, the terminal devices may be in a hybrid mode. Specifically, the terminal devices may use both the Mode 1 and Mode 2 for resource acquisition simultaneously.

In NR V2X system, a sidelink feedback mechanism, that is, feedback based Hybrid Automatic Repeat reQuest (HARQ) retransmission, is introduced. The sidelink feedback mechanism is not limited to unicast scenarios, but also may be applied to multicast scenarios.

Resource selection manner in the Mode 2 in NR V2X: In NR V2X, some new features are introduced, such as supporting a large number of aperiodic services, increasing retransmission times and more flexible resource reservation period. All these features have great influence on the independent resource selection mode (i.e. Mode 2) of terminal device. Therefore, on the basis of the above Mode B, the resource selection solution suitable for NR V2X is redesigned, which is called Mode 2.

In Mode 2, the terminal device selects a resource that is not reserved by other terminal devices or is reserved by other terminal devices but has a lower reception power in the resource pool by decoding Sidelink Control Information (SCI) transmitted by other terminal devices and measuring sidelink reception power. The resource selection algorithm of Mode 2 includes two main steps: the terminal device firstly determines a candidate resource set, and then selects a resource from the candidate resource set for transmitting data. These two steps are described below.

First step: The terminal device determines a candidate resource set.

Specifically, 1) the terminal device takes all available resources in a resource selection window as a resource set A; and 2) the terminal device performs the following exclusion operations on resources in the resource set A.

The terminal device determines whether a resource is reserved by other terminal devices according to a monitoring result in a resource monitoring window. The terminal device performs resource exclusion according to unmonitored time slots and monitored first stage SCI. After the resource exclusion is completed, if the number of remaining resources in the resource set A is less than a certain proportion, the terminal device may raise the Reference Signal Received Power (RSRP) threshold value, for example, may raise the RSRP threshold value by 3 dB, and repeat the resource exclusion operation until the number of remaining resources in the resource set A is greater than or equal to the proportion. As an example, the value range of this proportion is {20%, 35%, 50%}, and the value of the specific proportion is configured by the network or pre-configured in unit of resource pool. Finally, after the resource exclusion operation, a remaining resource set B is used as the candidate resource set of the terminal device.

Second step: The terminal device selects a transmission resource from the candidate resource set.

Specifically, the terminal device randomly selects one or more transmission resources with an equal probability in the resource set B. It should be noted that the following time domain restrictions should be met when selecting multiple transmission resources.

First restriction: After removing some exception situations, the terminal device shall enable the selected retransmission resource to be indicated by the first stage SCI previously transmitted. The above exception situations include the following first situation and second situation. In the first situation, after excluding the resources, the terminal device cannot select the resources, meeting the time domain limitation, from the resource set B. In the second situation, the terminal device does not transmission due to resources being occupied, congestion control and confliction with uplink services, resulting in the transmission resource of a retransmission being not indicated by the first stage SCI previously transmitted.

Second restriction: In order to ensure use of any two selected transmission resources, the two resources should be separated by at least a specified duration in the time domain if the former transmission resource requires HARQ feedback. When the resource selection cannot meet the time domain limit, depending on the implementation of the terminal device itself, the selection of some retransmission resources can be abandoned or HARQ feedback may be deactivated for several transmissions.

DRX Mechanism

Figure 3:
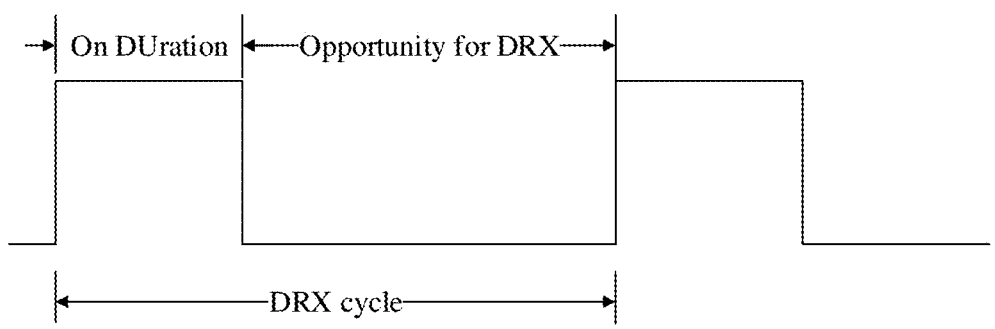
FIG. 3 is a schematic diagram of a DRX cycle provided by an embodiment of the present disclosure.

In the project of sidelink enhancement, it is discussed that the DRX mechanism is introduced in the sidelink transmission. The basic mechanism of DRX is to configure a DRX cycle for the terminal device. As illustrated in FIG. 3, the DRX cycle consists of an "On Duration" and an "Opportunity for DRX". During the "On Duration" (also called active time), the terminal device monitors and receives Physical Sidelink Control Channel (PSCCH) (that is, the terminal device is in an active state). If the PSCCH is not received by the terminal device during the "On Duration", the terminal device may stop continuous monitoring and turn to a sleep state during the "Opportunity for DRX" (also called sleep time), and the terminal device does not receive the PSCCH to reduce power consumption. In addition, the DRX mechanism also has a series of other complex mechanisms.

In the DRX mechanism, the terminal device controls DRX behavior of the terminal device according to the DRX parameters. For example, the terminal device needs to detect the PSCCH at DRX Active Time, in other words, the terminal device is in the DRX active state during the DRX Active Time. The running period of any one of the following timers belongs to the DRX Active time:

drx-onDurationTimer, drx-InactivityTimer, and drx-RetransmissionTimer.

For drx-onDurationTimer, the start or restart time point is determined as a fixed time point based on the configured DRX cycle. The running period of the drx-onDurationTimer corresponds to the "On Duration" illustrated in FIG. 3.

For drx-InactivityTimer, the start or restart condition is that the terminal device starts or restarts the drx-Inactivity-Timer if a PSCCH indicating an initial transmission (i.e. a new transmission) is received by the terminal device, as illustrated in FIG. 4.

At present, for the DRX mechanism in sidelink transmission, different DRX parameters may be used for different QoS parameters, so that the DRX parameter used for a physical transmission may be determined according to the QoS parameter associated with the physical transmission. However, in some situations, it is impossible to determine the DRX parameter corresponding to physical transmission. For example, not all the QoS parameters correspond to DRX parameters. For example, some physical transmissions are not associated with specific QoS parameters, thus, it is impossible to determine the DRX parameters corresponding to these physical transmissions. Therefore, the following technical solutions of the embodiments of the present disclosure are proposed.

It should be noted that the technical solutions of the embodiments of the present disclosure may be applied to sidelink communication, and further, may be applied to the unicast scenario, multicast scenario, broadcast scenario and the like in the sidelink communication.

FIG. 5 is a flowchart of a method for determining a DRX parameter provided by an embodiment of the present disclosure. As illustrated in FIG. 5, the method for determining the DRX parameter includes the following operations.

In operation 501, the terminal device determines a DRX parameter corresponding to a first physical transmission. The DRX parameter corresponding to the first physical transmission is a first DRX parameter corresponding to a QoS parameter associated with the first physical transmission or a default second DRX parameter.

In some alternative embodiments, the first physical transmission includes at least one of: a discovery message, a system information message, a paging message, or a direct link establishment request message.

In some alternative embodiments, the first physical transmission is a first sidelink physical transmission transmitted by the terminal device. For example, the first physical transmission is a discovery message or a direct link establishment request message transmitted by the terminal device.

In some alternative embodiments, the first physical transmission is a second sidelink physical transmission received by the terminal device. For example, the first physical transmission is a discovery message, a system information message, a paging message, or a direct link establishment request message received by the terminal device.

In the embodiment of the present disclosure, the terminal device determines that the DRX parameter corresponding to the first physical transmission is the first DRX parameter corresponding to the QoS parameter associated with the first physical transmission or the default second DRX parameter.

In the embodiment of the present disclosure, some DRX parameters corresponding to some QoS parameters and a default DRX parameter may be defined. The defined contents are called first configuration information. The first configuration information may be configured by a system message, a dedicated signaling, or may be pre-configured. The pre-configuration manner may be an manner of pre-configuring the first configuration information by the network or presetting the first configuration information in the terminal device.

In some alternative embodiments, the first configuration information includes DRX parameters corresponding to N QoS parameters, and N is a positive integer. Taking N=2 as an example, the first configuration information includes DRX parameter 1 corresponding to QoS parameter 1 and DRX parameter 2 corresponding to QoS parameter 2. In addition, the first configuration information further includes a default DRX parameter. It should be noted that the value of N is very large since there are a large number of QoS parameters.

It should be noted that the QoS parameters described in the embodiments of the present disclosure include a set of parameters. Different QoS parameters may mean different types of QoS parameters and different values of QoS parameters.

It should be noted that the DRX parameters described in the embodiments of the present disclosure include a set of parameters. Different DRX parameters may mean different types of DRX parameters and different values of DRX parameters.

As an example, QoS parameters include at least one of the following types of the parameters: a 5G QoS Identifier (5QI), an Allocation Retention Priority (ARP), a Guaranteed Flow Bit Rate (GFBR), a Maximum Flow Bit Rate (MFBR), a UL/DL Maximum Packet Loss Rate (UL/DL MPLR), a Packet Delay Budget (PDB), an AN-PDB, a Packet Error Rate (PER), a Priority Level, an Averaging Window, a Resource Type, a Maximum Data Burst Volume, a UE Aggregate Maximum Bit Rate (UE-AMBR), or a Session Aggregate Maximum Bit Rate (Session-AMBR). The following Table 1 shows the values of the set of parameters included in QoS parameters.

TABLE 1

| PQI Value | Resource Type | Default Priority | Package Delay Budget | Packet Error Rate | Default Maximum Data Burst Volume | Default Averaging Window |
|---|---|---|---|---|---|---|
| 21 | GBR | 3 | 20 ms | $10^{-4}$ | N/A | 2000 ms |
| 22 | | 4 | 50 ms | $10^{-2}$ | N/A | 2000 ms |
| 23 | | 3 | 100 ms | $10^{-4}$ | N/A | 2000 ms |
| 55 | Non- | 3 | 10 ms | $10^{-4}$ | N/A | N/A |
| 56 | GBR | 6 | 20 ms | $10^{-1}$ | N/A | N/A |
| 57 | | 5 | 25 ms | $10^{-1}$ | N/A | N/A |
| 58 | | 4 | 100 ms | $10^{-2}$ | N/A | N/A |
| 59 | | 6 | 500 ms | $10^{-1}$ | N/A | N/A |
| 90 | Delay | 3 | 10 ms | $10^{-4}$ | 2000 bytes | 2000 ms |
| 91 | Critical GBR | 2 | 3 ms | $10^{-5}$ | 2000 bytes | 2000 ms |

As an example, DRX parameters include at least one of the following types of the parameters: a DRX cycle, drx-onDurationTimer, drx-InactivityTimer, drx RTT Timer, drx-RetransmissionTimer, or drx offset.

The manner that the terminal device determines the DRX parameter corresponding to the first physical transmission is described below in different situations.

First Situation

The terminal device determines that the QoS parameter associated with the first physical transmission is the first QoS parameter, determines the first QoS parameter corresponding to the first DRX parameter based on the first configuration information, and the terminal device determines the first DRX parameter as the DRX parameter corresponding to the first physical transmission.

Second Situation

The terminal device determines that the QoS parameter associated with the first physical transmission is the first QoS parameter, determines that first configuration information includes no first QoS parameter, and the terminal device determines the second DRX parameter as the DRX parameter corresponding to the first physical transmission.

The second DRX parameter is a default DRX parameter configured in the first configuration information.

Third Situation

The terminal device determines that the first physical transmission has no associated QoS parameter, and the terminal device determines the second DRX parameter as the DRX parameter corresponding to the first physical transmission.

The second DRX parameter is a default DRX parameter configured in the first configuration information.

For example, the first configuration information includes two DRX parameters corresponding to two QoS parameters. Specifically, DRX parameter 1 corresponds to QoS parameter 1 and DRX parameter 2 corresponds to QoS parameter 2. In addition, the first configuration information further includes a default DRX parameter 3. For the first physical transmission, if the first physical transmission is associated with the QoS parameter 1, the DRX parameter 1 is used for performing the first physical transmission; if the first physical transmission is associated with the QoS parameter 2, the DRX parameter 2 is used for performing the first physical transmission; and if the first physical transmission is not associated with any QoS parameter, the DRX parameter 3 is used for performing the first physical transmission.

In operation 502, the terminal device performs the first physical transmission based on the DRX parameter corresponding to the first physical transmission.

In the embodiments of the present disclosure, the terminal device may determine the DRX behavior corresponding to the first physical transmission based on the DRX parameter corresponding to the first physical transmission, thereby performing the first physical transmission under the influence of the DRX behavior. For example, the DRX parameter includes a DRX cycle, a drx-onDurationTimer and a drx-InactivityTimer. The active time and the inactive time may be determined according to the DRX parameters, the terminal device receives or transmits the first physical transmission during the active time, and stops receiving or transmitting the first physical transmission during the inactive time.

Figure 6:
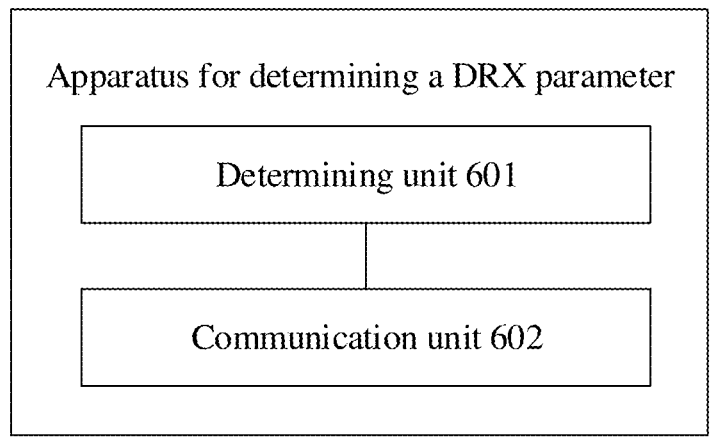
FIG. 6 is a schematic diagram of a structural composition of an apparatus for determining a DRX parameter provided by an embodiment of the present disclosure.

FIG. 6 is a schematic diagram of a structural composition of an apparatus for determining a DRX parameter provided by an embodiment of the present disclosure, the apparatus is applied to the terminal device. As illustrated in FIG. 6, the apparatus for determining the DRX parameter includes a determining unit 601 and a communication unit 602.

The determining unit is configured to determine a DRX parameter corresponding to a first physical transmission. The DRX parameter corresponding to the first physical transmission is a first DRX parameter corresponding to a QoS parameter associated with the first physical transmission or a default second DRX parameter.

The communication unit is configured to perform the first physical transmission based on the DRX parameter corresponding to the first physical transmission.

In some alternative embodiments, the determining unit 601 is configured to: determine that the QoS parameter associated with the first physical transmission is a first QoS parameter; determine, based on the first configuration information, the first QoS parameter corresponding to the first DRX parameter; and determine the first DRX parameter as the DRX parameter corresponding to the first physical transmission.

In some alternative embodiments, the determining unit 601 is configured to: determine that the QoS parameter associated with the first physical transmission is a first QoS parameter; determine that the first configuration information includes no first QoS parameter; and determine the second DRX parameter as the DRX parameter corresponding to the first physical transmission.

In some alternative embodiments, the determining unit 601 is configured to determine that the first physical transmission has no associated QoS parameter, and determine the second DRX parameter as the DRX parameter corresponding to the first physical transmission.

In some alternative embodiments, the second DRX parameter is a default DRX parameter configured in the first configuration information.

In some alternative embodiments, the first physical transmission includes at least one of: a discovery message, a system information message, a paging message, or a direct link establishment request message.

In some alternative embodiments, the first physical transmission is a first sidelink physical transmission transmitted by the terminal device.

In some alternative embodiments, the first physical transmission is a second sidelink physical transmission received by the terminal device.

Those skilled in the art will appreciate that the above related description of the apparatus for determining the DRX parameter in the embodiments of the present disclosure may be understood with reference to the related description of the method for determining the DRX parameter in the embodiments of the present disclosure.

Figure 7:
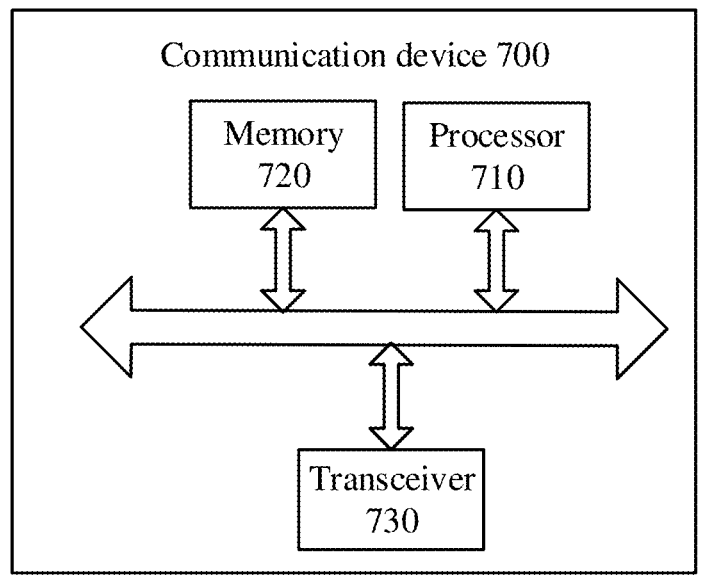
FIG. 7 is a schematic diagram of a structure of a communication device provided by an embodiment of the present disclosure.

FIG. 7 is a schematic diagram of a structure of a communication device 700 provided by an embodiment of the present disclosure. The communication device may be a terminal device. The communication device 700 illustrated in FIG. 7 includes a processor 710 configured to invoke and run a computer program from a memory to implement the method in the embodiments of the present disclosure.

Alternatively, as illustrated in FIG. 7, the communication device 700 further includes a memory 720. The processor 710 is configured to invoke and run a computer program from the memory 720 to implement the method in embodiments of the present disclosure.

The memory 720 may be a separate device independent of the processor 710 or may be integrated in the processor 710.

Alternatively, as illustrated in FIG. 7, the communication device 700 may further include a transceiver 730. The processor 710 may control the transceiver 730 to communicate with other devices, and in particular may transmit information or data to or receive information or data from other devices.

The transceiver 730 may include a transmitter and a receiver. Transceiver 730 may further include antennas, and the number of antennas may be one or more.

Alternatively, the communication device 700 may be specifically a mobile terminal/terminal device in the embodiments of the present disclosure, and the communication device 700 may implement corresponding processes implemented by the mobile terminal/terminal device in various methods of the embodiments of the present disclosure, which will not be elaborated herein again for the sake of brevity.

Figure 8:
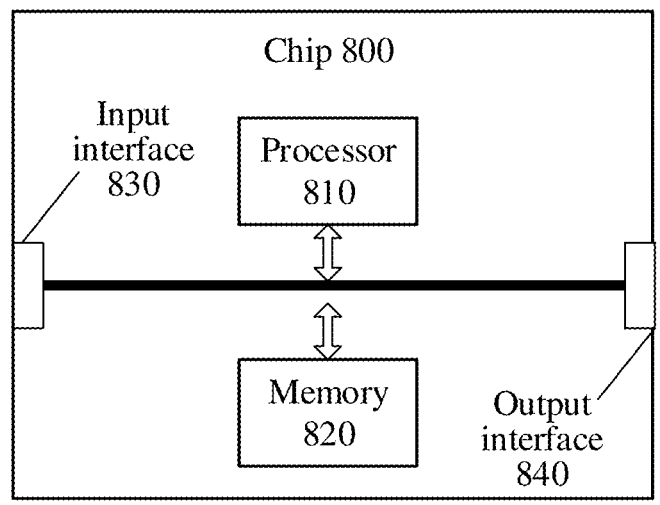
FIG. 8 is a schematic diagram of a structure of a chip provided by an embodiment of the present disclosure.

FIG. 8 is a schematic diagram of a structure of a chip provided by an embodiment of the present disclosure. The chip 800 illustrated in FIG. 8 includes a processor 810 configured to invoke and run a computer program from a memory to implement the method in the embodiments of the present disclosure.

Alternatively, as illustrated in FIG. 8, the chip 800 may further include a memory 820. The processor 810 may be configure to invoke and run a computer program from the memory 820 to implement the method in embodiments of the present disclosure.

The memory 820 may be a separate device independent of the processor 810 or may be integrated in the processor 810.

Alternatively, the chip 800 may further include an input interface 830. The processor 810 may control the input interface 830 to communicate with other devices or chips, and in particular may obtain information or data from other devices or chips.

Alternatively, the chip 800 may further include an output interface 840. The processor 810 may control the output interface 840 to communicate with other devices or chips, and in particular may output information or data to other devices or chips.

Alternatively, the chip may be applied to the mobile terminal/terminal device in the embodiments of the present disclosure, and the chip may implement the corresponding processes implemented by the mobile terminal/terminal device in various methods of the embodiment of the present disclosure, which will not be elaborated herein again for the sake of brevity.

It should be understood that the chips mentioned in embodiments of the present disclosure may also be referred to as system level chips, system chips, chip systems and chip-on system chips or the like.

It should be understood that the processor of the embodiments of the present disclosure may be an integrated circuit chip having signal processing capability. In implementation, the various steps of the above method embodiments may be accomplished by integrated logic circuitry of hardware in the processor or instructions in the form of software. The above processor may be a general purpose processor, a Digital Signal Processor (DSP), an Application Specific Integrated Circuit (ASIC), a Field Programmable Gate Array (FPGA) or other programmable logic devices, discrete gates or transistor logic devices, or discrete hardware components, and may implement or perform the methods, steps and logic block diagrams disclosed in embodiments of the present disclosure. The general purpose processor may be a microprocessor or the processor may be any conventional processor or the like. The steps of the method disclosed in combination with the embodiments of the present disclosure may be directly embodied through execution of the hardware decoding processor or execution of the hardware combined with software modules in the decoding processor. The software modules may be located in a random memory, a flash memory, a Read-Only Memory (ROM), a Programmable ROM (PROM), an electrically erasable programmable memory, a register and other storage mediums mature in the art. The storage medium is located in the memory, and the processor reads information from the memory and completes the steps of the method in combination with its hardware.

It is understood that the memory in embodiments of the present disclosure may be a volatile memory or non-volatile memory, or may include both the volatile memory and non-volatile memory. The non-volatile memory may be an ROM, a PROM, an Erasable PROM (EPROM), an Electrically EPROM (EEPROM), or a flash memory. The volatile memory may be a Random Access Memory (RAM) which serves as an external cache. By way of illustration but not limitation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory of the system and method described herein is intended to include but not limited to these and any other suitable types of memories.

It should be understood that the memories described above are exemplary but not limiting, for example, the memory in embodiments of the present disclosure may also be an SRAM, a DRAM, an SDRAM, a DDR SDRAM, an ESDRAM, an SLDRAM, a DR RAM, etc. That is, the memory in embodiments of the present disclosure is intended to include but not limited to these and any other suitable types of memories.

An embodiment of the present disclosure further provides a computer-readable storage medium for storing a computer program.

Alternatively, the computer-readable storage medium may be applied to the network device in the embodiments of the present disclosure, and the computer program causes a computer to perform the corresponding processes implemented by the network device in the various methods of the embodiments of the present disclosure, which will not be elaborated herein again for the sake of brevity.

Alternatively, the computer-readable storage medium may be applied to the mobile terminal/terminal device in the embodiments of the present disclosure, and the computer program causes the computer to perform corresponding processes implemented by the mobile terminal/terminal device in the various methods of the embodiments of the present disclosure, which will not be elaborated herein again for the sake of brevity.

An embodiment of the present disclosure further provides a computer program product including computer program instructions.

Alternatively, the computer program product may be applied to the network device in the embodiments of the present disclosure, and the computer program instructions cause the computer to perform the corresponding processes implemented by the network device in the various methods of the embodiments of the present disclosure, which will not be elaborated herein again for the sake of brevity.

Alternatively, the computer program product may be applied to the mobile terminal/terminal device in the embodiments of the present disclosure, and the computer program instructions cause the computer to perform the corresponding processes implemented by the mobile terminal/terminal device in the various methods of the embodiments of the present disclosure, which will not be elaborated herein again for the sake of brevity.

An embodiment of the present disclosure further provides a computer program.

Alternatively, the computer program may be applied to the network device in the embodiments of the present disclosure, and when the computer program is run on the computer, the computer program causes the computer to perform the corresponding processes implemented by the network device in the various methods of the embodiments of the present disclosure, which will not be elaborated herein again for the sake of brevity.

Alternatively, the computer program may be applied to the mobile terminal/terminal device in the embodiments of the present disclosure, and when the computer program is run on the computer, the computer program causes the computer to perform the corresponding processes implemented by the mobile terminal/terminal device in the various methods of the embodiments of the present disclosure, which will not be elaborated herein again for the sake of brevity.

Those of ordinary skill in the art will appreciate that the various example units and algorithm steps described in combination with the embodiments disclosed herein may be implemented by electronic hardware or a combination of computer software and electronic hardware. Whether these functions are performed in hardware or software depends on the specific application and design constraints of the technical solutions. Skilled person may use different methods each for a particular application to implement the described functions, but such implementation should not be considered beyond the scope of the present disclosure.

Those skilled in the art will clearly appreciate that, for convenience and conciseness of description, the specific operating processes of the above systems, apparatuses and units may refer to the corresponding processes in the aforementioned method embodiments, which will not be elaborated herein again.

In several embodiments provided the present disclosure, it should be understood that the disclosed systems, apparatuses and methods may be implemented in other ways. For example, the above apparatus embodiments are only schematic, for example, the partition of the unit is only a logical function partition, and in practice, there may be other partition modes, for example, multiple units or components may be combined or integrated into another system, or some features may be ignored or not be performed. On the other hand, the shown or discussed coupling or direct coupling or communication connection between each other may be indirect coupling or communication connection through some interfaces, apparatuses or units, and may be electrical, mechanical or other forms.

The units illustrated as separate elements may be or may not be physically separated, and the elements displayed as units may be or may not be physical units, i.e. may be located in one place, or may be distributed over a plurality of network units. Part or all of the units may be selected according to the actual needs to achieve the purpose of the embodiments.

In addition, various functional units in various embodiments of the present disclosure may be integrated in a processing unit, alternatively, each unit may exist physically alone, or two or more units may be integrated in one unit.

The functions may be stored in a computer-readable storage medium if the functions are implemented in the form of software functional units and sold or used as stand-alone products. Based on this understanding, the technical solutions of the present disclosure, in essence or the part that contributes to the prior art or part of the technical solutions, may be embodied in the form of a software product. The computer software product is stored in a storage medium and includes instructions that causes a computer device (which may be a personal computer, a server, a network device, etc.) to perform all or part of the operations of the method described in various embodiments of the present disclosure. The aforementioned storage medium includes a U disk, a removable hard disk, an ROM, an RAM, a magnetic disk or an optical disk and other mediums capable of storing program codes.

In the above technical solutions, the terminal device determines that the DRX parameter corresponding to the first physical transmission is the first DRX parameter corresponding to the QoS parameter associated with the first physical transmission or the default second DRX parameter, so that the first physical transmission can be performed based on the DRX parameter corresponding to the first physical transmission. Thus, the DRX mechanism is realized and the purpose of saving power of the terminal device is achieved.

The above description is only the specific embodiments of the present disclosure, but the scope of protection of the present disclosure is not limited thereto. Any person skilled in the art familiar with the technical filed may easily conceive changes or substitutions that are covered within the scope of protection of the present disclosure. Therefore, the protection scope of the present disclosure should be subject to the protection scope of the claims.

The invention claimed is:

1. A method for determining a Discontinuous Reception (DRX) parameter, comprising:
    determining, by a terminal device, a DRX parameter corresponding to a first physical transmission, the DRX parameter corresponding to the first physical transmission being a first DRX parameter corresponding to a Quality of Service (QOS) parameter associated with the first physical transmission or a default second DRX parameter; and
    performing, by the terminal device, the first physical transmission based on the DRX parameter corresponding to the first physical transmission,
    wherein determining, by the terminal device, the DRX parameter corresponding to the first physical transmission comprises:
        determining, by the terminal device, that the QoS parameter associated with the first physical transmission is a first QoS parameter;
        determining, by the terminal device, that the first QoS parameter corresponds to the first DRX parameter based on first configuration information; and
        determining, by the terminal device, the first DRX parameter as the DRX parameter corresponding to the first physical transmission.

2. The method of claim 1, wherein determining, by the terminal device, the DRX parameter corresponding to the first physical transmission further comprises:
    determining, by the terminal device, that the first configuration information comprises no first QoS parameter; and
    determining, by the terminal device, the second DRX parameter as the DRX parameter corresponding to the first physical transmission.

3. The method of claim 2, wherein the second DRX parameter is a default DRX parameter configured in the first configuration information.

4. The method of claim 3, wherein the first physical transmission comprises at least one of: a discovery message, a system information message, a paging message, or a direct link establishment request message.

5. The method of claim 2, wherein the first physical transmission comprises at least one of: a discovery message, a system information message, a paging message, or a direct link establishment request message.

6. The method of claim 1, wherein the first physical transmission comprises at least one of: a discovery message, a system information message, a paging message, or a direct link establishment request message.

7. A terminal device comprising:
    a processor;
    a transceiver; and a memory configured to store a computer program, and the processor being configured to invoke and run the computer program stored in the memory to:
determine a Discontinuous Reception (DRX) parameter corresponding to a first physical transmission, the DRX parameter corresponding to the first physical transmission being a first DRX parameter corresponding to a Quality of Service (QOS) parameter associated with the first physical transmission or a default second DRX parameter; and
control the transceiver to perform the first physical transmission based on the DRX parameter corresponding to the first physical transmission,
wherein the processor is further configured to:
determine that the QoS parameter associated with the first physical transmission is a first QoS parameter;
determine that the first QoS parameter corresponds to the first DRX parameter based on first configuration information; and
determine the first DRX parameter as the DRX parameter corresponding to the first physical transmission.

8. The terminal device of claim 7, wherein the processor is further configured to:
determine that the first configuration information comprises no first QoS parameter; and
determine the second DRX parameter as the DRX parameter corresponding to the first physical transmission.

9. The terminal device of claim 8, wherein the second DRX parameter is a default DRX parameter configured in the first configuration information.

10. The terminal device of claim 9, wherein the first physical transmission comprises at least one of: a discovery message, a system information message, a paging message, or a direct link establishment request message.

11. The terminal device of claim 8, wherein the first physical transmission comprises at least one of: a discovery message, a system information message, a paging message, or a direct link establishment request message.

12. The terminal device of claim 7, wherein the first physical transmission comprises at least one of: a discovery message, a system information message, a paging message, or a direct link establishment request message.

13. A non-transitory computer-readable storage medium for storing a computer program that, when being executed by a computer, causes the computer to perform operations comprising:
determining a Discontinuous Reception (DRX) parameter corresponding to a first physical transmission, the DRX parameter corresponding to the first physical transmission being a first DRX parameter corresponding to a Quality of Service (QOS) parameter associated with the first physical transmission or a default second DRX parameter; and
performing the first physical transmission based on the DRX parameter corresponding to the first physical transmission,
wherein determining the DRX parameter corresponding to the first physical transmission comprises:
determining that the QoS parameter associated with the first physical transmission is a first QoS parameter;
determining that the first QoS parameter corresponds to the first DRX parameter based on first configuration information; and
determining the first DRX parameter as the DRX parameter corresponding to the first physical transmission.

14. The non-transitory computer-readable storage medium of claim 13, wherein determining the DRX parameter corresponding to the first physical transmission further comprises:
determining that the first configuration information comprises no first QoS parameter; and
determining the second DRX parameter as the DRX parameter corresponding to the first physical transmission.

15. The non-transitory computer-readable storage medium of claim 13, wherein the second DRX parameter is a default DRX parameter configured in the first configuration information, and the first physical transmission comprises at least one of: a discovery message, a system information message, a paging message, or a direct link establishment request message.

* * * * *